US011851939B2

(12) United States Patent
Cate et al.

(10) Patent No.: US 11,851,939 B2
(45) Date of Patent: Dec. 26, 2023

(54) MOVABLE BARRIER OPERATOR HAVING UPDATABLE SECURITY PROTOCOL

(71) Applicant: The Chamberlain Group LLC, Oak Brook, IL (US)

(72) Inventors: Casparus Cate, Chicago, IL (US); David R. Morris, Glenview, IL (US); Brian Roy Skotty, Elmhurst, IL (US); Cory Jon Sorice, LaGrange, IL (US)

(73) Assignee: The Chamberlain Group LLC, Oak Brook, IL (US)

( * ) Notice: Subject to any disclaimer, the term of this patent is extended or adjusted under 35 U.S.C. 154(b) by 722 days.

(21) Appl. No.: 16/968,468

(22) PCT Filed: Feb. 7, 2019

(86) PCT No.: PCT/US2019/017005
§ 371 (c)(1),
(2) Date: Aug. 7, 2020

(87) PCT Pub. No.: WO2019/157149
PCT Pub. Date: Aug. 15, 2019

(65) Prior Publication Data
US 2020/0402337 A1    Dec. 24, 2020

Related U.S. Application Data

(60) Provisional application No. 62/629,442, filed on Feb. 12, 2018.

(51) Int. Cl.
*E05F 15/77*    (2015.01)
*E05F 15/611*    (2015.01)
(Continued)

(52) U.S. Cl.
CPC ............ *E05F 15/77* (2015.01); *E05F 15/611* (2015.01); *E05F 15/668* (2015.01);
(Continued)

(58) Field of Classification Search
CPC ....... E05F 15/77; E05F 15/611; E05F 15/668; E05F 15/60; G07C 9/00182;
(Continued)

(56) References Cited

U.S. PATENT DOCUMENTS 4,360,807 A    11/1982    Zettergren
4,464,651 A    8/1984    Duhame
(Continued)

FOREIGN PATENT DOCUMENTS

| CN | 106951253 | 7/2017 |
| WO | 1996035196 | 11/1996 |
| WO | 2019157149 | 8/2019 |

OTHER PUBLICATIONS

Integrating GPS data within embedded Internet GIS; Arunas Stockus, Alain Bouju, Frédéric Bertrand, Patrice Boursier; "GIS '99: Proceedings of the 7th ACM international symposium on Advances in geographic information systems, pp. 134-139; Date of Publication: Nov. 1999"; https://doi.org/10.1145/320134.320168.
(Continued)

*Primary Examiner* — Ojiako K Nwugo
(74) *Attorney, Agent, or Firm* — Barta, Jones & Foley, PLLC

(57) ABSTRACT

A movable barrier operator system including a movable barrier operator configured to be connected to a movable barrier and move the movable barrier. The system includes a remote control configured to utilize a first security protocol to wirelessly transmit a communication to the movable barrier operator and cause the movable barrier operator to move the movable barrier. The movable barrier operator is configured to receive information representative of a second security protocol and to eliminate a compatibility of the movable barrier operator with communications from the remote control utilizing the first security protocol.

21 Claims, 12 Drawing Sheets

(51) Int. Cl.

| | | |
|---|---|---|
| *E05F 15/668* | (2015.01) | |
| *G07C 9/29* | (2020.01) | |
| *G07C 9/21* | (2020.01) | |
| *G07C 9/00* | (2020.01) | |
| *H04W 12/08* | (2021.01) | |
| *E05F 15/60* | (2015.01) | |
| *H04W 80/00* | (2009.01) | |

(52) U.S. Cl.
CPC ..... *G07C 9/00182* (2013.01); *G07C 9/00817* (2013.01); *G07C 9/00896* (2013.01); *G07C 9/21* (2020.01); *G07C 9/29* (2020.01); *H04W 12/08* (2013.01); *E05F 15/60* (2015.01); *E05Y 2400/10* (2013.01); *E05Y 2400/66* (2013.01); *E05Y 2400/80* (2013.01); *E05Y 2400/85* (2013.01); *E05Y 2900/106* (2013.01); *G07C 2009/00388* (2013.01); *G07C 2009/00769* (2013.01); *G07C 2009/00825* (2013.01); *G07C 2009/00928* (2013.01); *H04W 80/00* (2013.01)

(58) Field of Classification Search
CPC .. G07C 9/00817; G07C 9/00896; G07C 9/21; G07C 9/29; G07C 2009/00388; G07C 2009/00769; G07C 2009/00825; G07C 2009/00928; E05Y 2400/10; E05Y 2400/66; E05Y 2400/80; E05Y 2400/85; E05Y 2900/106; H04W 80/00; H04W 12/08
See application file for complete search history.

(56) References Cited

U.S. PATENT DOCUMENTS

| | | | |
|---|---|---|---|
| 5,555,502 A | 9/1996 | Opel | |
| 5,565,843 A | 10/1996 | Meyvis | |
| 5,899,956 A | 5/1999 | Chan | |
| 6,025,785 A | 2/2000 | Farris | |
| 6,158,655 A | 12/2000 | Devries, Jr. | |
| 6,166,698 A | 12/2000 | Turnbull | |
| 6,167,137 A | 12/2000 | Marino | |
| 6,239,569 B1 | 5/2001 | Fitzgibbon | |
| 6,271,765 B1 | 8/2001 | King | |
| 6,278,249 B1 | 8/2001 | Fitzgibbon | |
| 6,308,083 B2 | 10/2001 | King | |
| 6,326,754 B1 | 12/2001 | Mullet | |
| 6,400,956 B1 | 6/2002 | Richton | |
| 6,411,887 B1 | 6/2002 | Martens | |
| 6,476,732 B1 | 11/2002 | Stephan | |
| 6,484,784 B1 | 11/2002 | Weik, III | |
| 6,487,495 B1 | 11/2002 | Gale | |
| 6,526,335 B1 | 2/2003 | Treyz | |
| 6,559,775 B1 | 5/2003 | King | |
| 6,615,132 B1 | 9/2003 | Nagasaka | |
| 6,624,605 B1 | 9/2003 | Powder | |
| 6,690,268 B2 | 2/2004 | Schofield | |
| 6,707,421 B1 | 3/2004 | Drury | |
| 6,708,086 B2 | 3/2004 | Richard | |
| 6,711,474 B1 | 3/2004 | Treyz | |
| 6,791,472 B1 | 9/2004 | Hoffberg | |
| 6,812,942 B2 | 11/2004 | Ribak | |
| 6,856,820 B1 | 2/2005 | Kolls | |
| 6,940,492 B2 | 9/2005 | Maritzen | |
| 6,978,206 B1 | 12/2005 | Pu | |
| 6,988,026 B2 | 1/2006 | Breed | |
| 7,038,409 B1 | 5/2006 | Mullet | |
| 7,088,265 B2 | 8/2006 | Tsui | |
| 7,103,460 B1 | 9/2006 | Breed | |
| 7,113,090 B1 | 9/2006 | Saylor | |
| 7,158,881 B2 | 1/2007 | McCarthy | |
| 7,205,892 B2 | 4/2007 | Luebke | |
| 7,205,908 B2 | 4/2007 | Tsui | |
| 7,224,324 B2 | 5/2007 | Quist | |
| 7,257,426 B1 | 8/2007 | Witkowski | |
| 7,272,497 B2 | 9/2007 | Koshiji | |
| 7,298,289 B1 | 11/2007 | Hoffberg | |
| 7,315,143 B2 | 1/2008 | Mullet | |
| 7,386,318 B2 | 6/2008 | Moon | |
| 7,415,243 B2 | 8/2008 | Yuhara | |
| 7,440,845 B1 | 10/2008 | Laverick | |
| 7,468,676 B2 | 12/2008 | Styers | |
| 7,493,726 B2 | 2/2009 | Fitzgibbon | |
| 7,532,965 B2 | 5/2009 | Robillard | |
| 7,602,283 B2 | 10/2009 | John | |
| 7,710,284 B2 | 5/2010 | Dzurko | |
| 7,869,582 B2 | 1/2011 | Styers | |
| 7,999,721 B2 | 8/2011 | Orr | |
| 8,040,217 B2 | 10/2011 | Fitzgibbon | |
| 8,218,739 B2 | 7/2012 | Styers | |
| 8,410,930 B2 | 4/2013 | Karasek | |
| 8,525,723 B2 | 9/2013 | Orr | |
| 8,587,404 B2 | 11/2013 | Laird | |
| 8,611,919 B2 | 12/2013 | Barnes, Jr. | |
| 9,141,099 B2 | 9/2015 | Cate | |
| 9,756,233 B2 | 9/2017 | Lee | |
| 9,986,435 B2 | 5/2018 | Potkonjak | |
| 10,060,175 B1 | 8/2018 | Lickfelt | |
| 10,127,384 B2 | 11/2018 | Shah | |
| 10,184,287 B2 * | 1/2019 | Tehranchi | E05F 15/70 |
| 10,358,859 B2 | 7/2019 | Lickfelt | |
| 10,837,217 B2 | 11/2020 | Cate | |
| 10,846,956 B2 | 11/2020 | Cate | |
| 10,873,828 B2 | 12/2020 | Lau | |
| 10,907,398 B2 | 2/2021 | Cate | |
| 11,210,875 B2 | 12/2021 | Cate | |
| 11,225,823 B2 | 1/2022 | Cate | |
| 2002/0055924 A1 | 5/2002 | Liming | |
| 2002/0085043 A1 | 7/2002 | Ribak | |
| 2002/0147006 A1 | 10/2002 | Coon | |
| 2002/0173889 A1 | 11/2002 | Odinak | |
| 2002/0193946 A1 | 12/2002 | Turnbull | |
| 2003/0006888 A1 | 1/2003 | Burchette | |
| 2003/0007261 A1 | 1/2003 | Hutzel | |
| 2003/0055557 A1 | 3/2003 | Dutta | |
| 2003/0071590 A1 | 4/2003 | Roman | |
| 2003/0140107 A1 | 7/2003 | Rezvani | |
| 2003/0182026 A1 | 9/2003 | Awada | |
| 2003/0197594 A1 | 10/2003 | Olson | |
| 2003/0197595 A1 | 10/2003 | Olson | |
| 2004/0034455 A1 | 2/2004 | Simonds | |
| 2004/0093154 A1 | 5/2004 | Simonds | |
| 2004/0110472 A1 | 6/2004 | Witkowski | |
| 2004/0158371 A1 | 8/2004 | Iggulden | |
| 2004/0212498 A1 | 10/2004 | Peterson | |
| 2004/0246607 A1 | 12/2004 | Watson | |
| 2005/0012631 A1 | 1/2005 | Gregori | |
| 2005/0024230 A1 | 2/2005 | Chuey | |
| 2005/0176400 A1 | 8/2005 | Mullet | |
| 2005/0195066 A1 | 9/2005 | Vandrunen | |
| 2006/0005018 A1 | 1/2006 | Alculumbre | |
| 2006/0041373 A1 | 2/2006 | Rowe | |
| 2006/0050018 A1 | 3/2006 | Hutzel | |
| 2006/0158339 A1 | 7/2006 | Brundula | |
| 2007/0058811 A1 * | 3/2007 | Fitzgibbon | C12N 15/115 380/268 |
| 2007/0146118 A1 | 6/2007 | Rodriguez | |
| 2007/0273472 A1 * | 11/2007 | Gregori | G07C 9/00182 340/5.71 |
| 2008/0132220 A1 * | 6/2008 | Fitzgibbon | H04M 3/42 455/414.1 |
| 2011/0010543 A1 * | 1/2011 | Schmidt | H04W 12/06 713/168 |
| 2011/0035604 A1 * | 2/2011 | Habraken | G07F 7/1016 235/382 |
| 2013/0060357 A1 * | 3/2013 | Li | H04L 12/281 700/90 |
| 2013/0063243 A1 | 3/2013 | Witkowski | |
| 2013/0117078 A1 * | 5/2013 | Weik, III | G06Q 10/00 705/13 |
| 2013/0147600 A1 | 6/2013 | Murray | |
| 2013/0179238 A1 * | 7/2013 | Warner, IV | G07B 15/02 705/13 |

(56) References Cited

U.S. PATENT DOCUMENTS

| | | | | |
|---|---|---|---|---|
| 2013/0201286 | A1* | 8/2013 | Schockmel | G08C 19/00 |
| | | | | 348/46 |
| 2014/0129606 | A1* | 5/2014 | Cate | E05F 15/40 |
| | | | | 709/201 |
| 2014/0237564 | A1* | 8/2014 | Dudziak | H04L 63/08 |
| | | | | 726/6 |
| 2015/0137941 | A1* | 5/2015 | Bauer | G07C 9/00182 |
| | | | | 340/5.61 |
| 2015/0227284 | A1* | 8/2015 | Tehranchi | G05B 23/0216 |
| | | | | 715/835 |
| 2015/0228135 | A1* | 8/2015 | Tehranchi | G07C 9/28 |
| | | | | 340/5.61 |
| 2016/0010382 | A1 | 1/2016 | Cate | |
| 2016/0078264 | A1* | 3/2016 | Armstrong | G08B 13/248 |
| | | | | 340/572.1 |
| 2016/0194912 | A1 | 7/2016 | Fitzgibbon | |
| 2016/0196706 | A1* | 7/2016 | Tehranchi | H04L 63/08 |
| | | | | 340/5.61 |
| 2016/0371910 | A1* | 12/2016 | Baumgarte | G07C 9/00817 |
| 2016/0379425 | A1* | 12/2016 | Tehranchi | G07C 9/00174 |
| | | | | 340/5.61 |
| 2017/0103599 | A1* | 4/2017 | Siegesmund | E05F 15/686 |
| 2017/0241189 | A1 | 8/2017 | Fitzgibbon | |
| 2018/0167948 | A1* | 6/2018 | Egner | H04W 72/541 |
| 2018/0245395 | A1 | 8/2018 | Huggins | |
| 2018/0350170 | A1* | 12/2018 | Wang | G06F 1/3231 |
| 2018/0375965 | A1* | 12/2018 | Fitzgibbon | G08C 17/02 |
| 2019/0010382 | A1 | 1/2019 | Kuznetsov | |
| 2019/0085615 | A1 | 3/2019 | Cate | |
| 2019/0249481 | A1 | 8/2019 | Cate | |
| 2019/0392691 | A1 | 12/2019 | Cheng | |
| 2020/0240198 | A1 | 7/2020 | Cate | |
| 2020/0242862 | A1 | 7/2020 | Cate | |
| 2020/0336906 | A1* | 10/2020 | Belhareth | H04L 65/1069 |
| 2021/0019964 | A1 | 1/2021 | Cate | |
| 2021/0123288 | A1 | 4/2021 | Cate | |

OTHER PUBLICATIONS

Intelligent pervasive middleware for context-based and localized telematics services; Chatschik Bisdikian, Isaac Boamah, Paul Castro, Archan Misra, Jim Rubas, Nicolas Villoutreix, Danny Yeh, Vladimir Rasin, Henry Huang, Craig Simonds; "WMC '02: Proceedings of the 2nd international workshop on Mobile commerce, pp. 15-24; Date of Publication: Sep. 2002"; https://doi.org/10.1145/570705.570710.

Interfaces, autonomy, & interactions in automobile driving; Erwin R. Boer, Michael A. Goodrich; "CHI EA '04: CHI '04 Extended Abstracts on Human Factors in Computing Systems, pp. 1578-1579; Date of Publication: Apr. 2004"; https://doi.org/10.1145/985921.986153.

Next century challenges: Nexus—an open global infrastructure for spatial-aware applications; Fritz Hohl, Uwe Kubach, Alexander Leonhardi, Kurt Rothermel, Markus Schwehm; "MobiCom '99: Proceedings of the 5th annual ACM/IEEE international conference on Mobile computing and networking, pp. 249-255 Date of Publication: Aug. 1999"; https://doi.org/10.1145/313451.313549.

Towards scalable location-aware services: requirements and research issues; Mohamed F. Mokbel, Walid G. Aref, Susanne E. Hambrusch, Sunil Prabhakar, "GIS '03: Proceedings of the 11th ACM international symposium on Advances in geographic information systems, pp. 110-117; Date of Publication: Nov. 2003"; https://doi.org/10.1145/956676.956691.

USPTO; U.S. Appl. No. 17/064,255; Notice of Allowance dated Aug. 11, 2021; (pp. 1-31).

USPTO; U.S. Appl. No. 17/064,255; Notice of Allowance dated Aug. 11, 2021; (pp. 1-7).

USPTO; U.S. Appl. No. 17/082,691; Notice of Allowance dated Sep. 2, 2021; (pp. 1-7).

USPTO; U.S. Appl. No. 17/064,255; Notice of Allowance and Fees Due (PTOL-85) dated Oct. 13, 2021; (pp. 1-2).

Austalian Patent Application No. 2019217958; Examination Report No. 1; dated Jan. 17, 2023, 2 pages.

USPTO; U.S. Appl. No. 17/064,255; Notice of Allowance and Fees Due (PTOL-85) dated Aug. 11, 2021; (31 pages).

USPTO; U.S. Appl. No. 17/082,691; Notice of Allowance and Fees Due (PTOL-85) dated Nov. 22, 2021; (pp. 1-2).

Canadian Patent Application No. 2,693,580; Office Action dated Mar. 24, 2015; 4 pages.

PCT Patent Application No. PCT/US2019/017005; International Search Report and Written Opinion dated May 19, 2019.

The Genie Company, Instructions for Closed Confirm™ Remote Installation and Operation, publicly available before Jan. 24, 2019, 1 page.

UL Standard for Safety for Door, Drapery, Gate, Louver, and Window Operators and Systems, UL 325 Fifth Edition, Dated Jun. 7, 2002; pp. 1-186.

USPTO; U.S. Appl. No. 16/257,045; Notice of Allowance dated Jul. 9, 2020; (pp. 1-12).

USPTO; U.S. Appl. No. 16/272,728; Notice of Allowance dated Sep. 28, 2020; (pp. 1-11).

USPTO; U.S. Appl. No. 16/272,728; Office Action dated Jan. 15, 2020; (pp. 1-24).

USPTO; U.S. Appl. No. 16/272,728; Office Action dated May 29, 2020, (pp. 1-30).

USPTO; U.S. Appl. No. 16/596,330; Notice of Allowance dated Jul. 8, 2020; (pp. 1-12).

Wayback Machine archive of https://geniecompany.com/garage-door-openers/accessories/closed-confirm-remote.aspx, website publicly available as of Oct. 28, 2016, 3 pages.

Canadian Patent Application No. 3,069,208; Office Action dated Jan. 17, 2023; 3 pages.

* cited by examiner

| Data Structure | | |
|---|---|---|
| Remote Control | Frequency (mHz) | Encryption |
| 1 | 315 | Security+ 2.0 |
| 2 | 315 | Security+ 2.0 |
| 3 | 315 | Security+ 2.0 |
| . | | |
| . | | |
| . | | |
| MBO | Frequency (mHz) | Encryption |
| 1 | 315 | Security+ 2.0 |

*FIG. 5*

MOVABLE BARRIER OPERATOR HAVING UPDATABLE SECURITY PROTOCOL

CROSS-REFERENCE TO RELATED APPLICATIONS

This application is a U.S. national phase application of PCT/US2019/017005, filed Feb. 7, 2019, designating the United States, which claims the benefit of U.S. Provisional Patent App. No. 62/629,442, filed Feb. 12, 2018, which are all hereby incorporated by reference herein in their entireties.

FIELD

This disclosure relates to movable barrier operators and, more specifically, to movable barrier operators and associated remote controls thereof that utilize security protocols to ensure the movable barrier operators respond only to authorized remote controls.

BACKGROUND

Various types of movable barrier operators are known. Some examples include garage door, jamb-type, jackshaft, and gate operators. These operators can move various types of movable barriers including one-piece doors, segmented doors, tilting doors, and gates. One common type of movable barrier operator system is a garage door opener that includes a track, a trolley connected to a garage door, and a head unit having a motor for driving the trolley along the track to thereby cause movement of the garage door.

Garage door openers are often sold or packaged with portable remote controls that a user can utilize to cause the garage door opener to open or close the associated garage door. Portable remote controls may alternatively be sold or packaged separately from garage door openers. The head unit and the remote controls communicate with each other via a common security protocol to ensure that only authorized remote controls can operate the head unit. The security protocol, such as the Security+2.0 security protocol utilized by some garage door openers sold by the Chamberlain Group Inc., may be programmed into a controller of the head unit and the remote controls at a manufacturing facility. The security protocol may be programmed into a head unit controller at the manufacturing facility in a number of different ways. For example, a security protocol could be programmed into the controller as a subset of the firmware/software before mounting to a printed circuit board (PCB). As another example, a controller could be programmed or otherwise loaded with the security protocol after installation on the PCB.

Manufacturers of garage door openers introduce new models with more current hardware in the marketplace from time to time. The new hardware may enable updated or completely new features, functionality and capabilities. New garage door operator hardware, for example including larger memory/storage and faster processing resources, may additionally facilitate newer security protocols that may be more secure than older security protocols. But with the expected lifetime of a garage door opener being measured in years, the features, capabilities, and security protocol of a garage door opener remain fixed to those provided at manufacture. Accordingly to obtain new features or capabilities, a new garage door opener would be purchased and installed as a replacement although an existing, older garage door opener is still functional albeit without the new features and/or capabilities.

BRIEF DESCRIPTION OF THE DRAWINGS

FIG. 5 illustrates the example data structure of FIG. 4 after the security protocols utilized by the movable barrier operator and remote controls have been updated;

Figure 1:
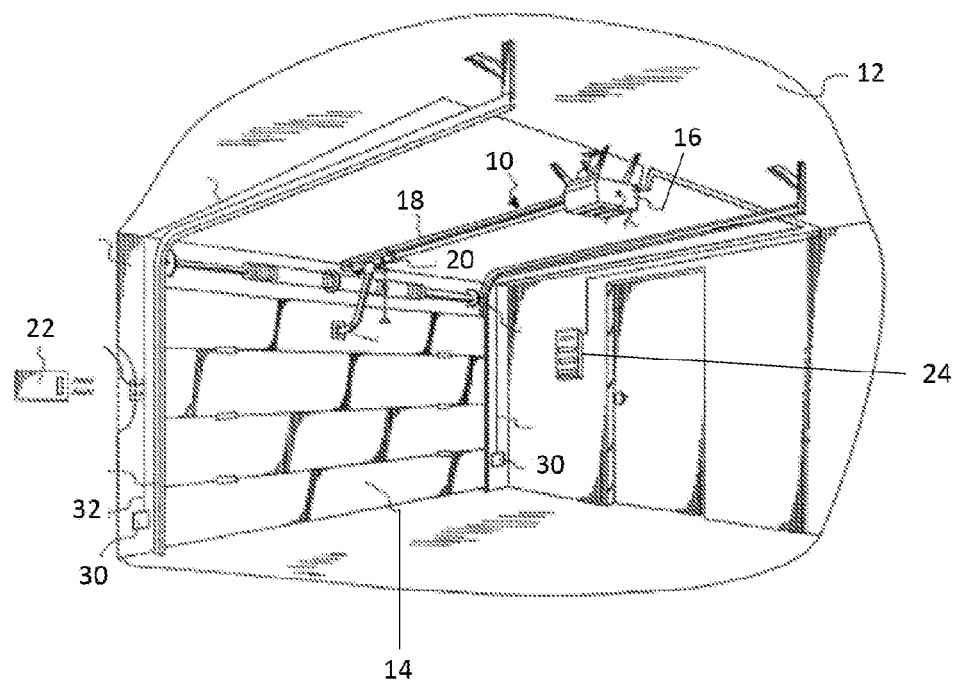
FIG. 1 is a perspective view of an example moveable barrier operator in a garage.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted to facilitate a less obstructed view of these various embodiments. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

In accordance with one aspect of the disclosure, a movable barrier operator system is provided for moving a movable barrier between first and second positions. The system includes a movable barrier operator configured to be connected to the movable barrier and a remote control configured to utilize a first security protocol to wirelessly transmit a communication to the movable barrier operator. The movable barrier operator is configured to receive information representative of a second security protocol and to eliminate a compatibility of the movable barrier operator with communications utilizing the first security protocol from the remote control. The movable barrier operator system permits the security protocol utilized by the movable barrier operator to be updated without the user having to replace a portion of or all of the hardware constituting the movable barrier operator.

For example, the movable barrier operator and the remote control (e.g. a keypad) may be updated to permit a user to control remote multi-user credentialing. Before the user may utilize the remote multi-user credentialing capability, the movable barrier operator and the keypad may need to be updated from a first security protocol (programmed at manufacture of the movable barrier operator/keypad) to a second security protocol (the current security protocol offered by the manufacturer). The update involves the movable barrier operator receiving information representative of the second security protocol, and the keypad receiving information representative of the second security protocol. The movable barrier operator eliminates the compatibility of the movable barrier operator with communications utilizing the first security protocol from the keypad.

Once the movable barrier operator and the keypad have been updated, the user can provide temporary personal identification numbers (PINs) to the movable barrier operator and guests such as by a cloud-based computing device. A newly-credentialed guest could then enter her PIN at the keypad to cause the movable barrier operator to open the movable barrier.

As one example, a homeowner is interested in subscribing to or otherwise using a delivery service for having items (e.g., purchases from an ecommerce web site or another retailer) delivered to or picked up from the homeowner's garage in an unattended manner. As another example, the homeowner may be interested in housekeeping services that enter the homeowner's property through a garage of the property when the homeowner is not present. The movable barrier operator is reconfigurable or updateable (e.g., by receiving a communication from a local or remote entity, wired or wirelessly) to enable or otherwise activate the capability of the movable barrier operator to permit the delivery service or housekeeping service to access the garage. The user can authorize the service to access the area secured by the movable barrier operator, and the cloud-based computing device can provide a temporary PIN to the movable barrier operator and an agent of the delivery or housekeeping service. When the agent of the service enters the temporary PIN at the keypad, the keypad sends a communication utilizing the second security protocol and including the temporary PIN to the garage door opener. The garage door opener operator authorizes the communication and opens the movable barrier.

The movable barrier operator system may be reconfigurable or updatable in a number of approaches. In one embodiment, the movable barrier operator and/or the remote control has the capability (e.g., hardware including communication interface, processing resources, and/or memory resources) to provide a functionality but the functionality is programmed but not enabled. This latent functionality may be activated or triggered after implementation of the movable barrier and/or remote control. For example, the movable barrier operator and/or remote control may receive a digital key from a remote cloud-based computer to unlock or enable the functionality. In another embodiment, the movable barrier operator and/or remote control has the capability (e.g., hardware including communication interface, processing resources, and/or memory resources) to provide a functionality but does not contain the programming to provide the functionality. The functionality may be added to the movable barrier operator and/or the remote control by, for example, a remote cloud-based computer sending a software or firmware update to the movable barrier operator and/or remote control.

Another advantage of the system is that the security protocol utilized by the movable barrier can be updated without the user or the manufacturer having to identify the security protocol currently used by the movable barrier operator. For example, if the movable barrier operator was configured with a first generation security protocol by the manufacturer, and had not yet been installed during the duration of a second generation security protocol, the movable barrier operator can be updated to a third generation security protocol once the movable barrier operator receives information representative of the third generation security protocol.

The remote control may include a transceiver configured to receive information representative of the second security protocol and to transmit a communication utilizing the second security protocol. In response to the movable barrier operator receiving the communication utilizing the second security protocol from the remote control, the movable barrier operator is configured to eliminate the compatibility of the movable barrier operator with communications utilizing the first security protocol from the remote control. In this manner, the movable barrier operator ensures that the movable barrier operator remains compatible with communications utilizing the first security protocol from the remote control until the remote control updates to the second security protocol. Further, the movable barrier operator and the remote control may be configured to automatically update to the second security protocol once the movable barrier operator receives the second security protocol. In other forms, the system may prompt a user for authorization or otherwise request user permission before updating the movable barrier operator and/or the remote control to the second security protocol.

In another aspect of the disclosure, a method of updating security protocol is provided for a movable barrier operator and a remote control. The remote control is configured to transmit communications utilizing a first security protocol to the movable barrier operator. The method includes receiving, at the movable barrier operator, information representative of the second security protocol. The method includes receiving, at the remote control, information representative of a second security protocol. The method further includes eliminating a compatibility of the movable barrier operator with communications utilizing the first security protocol from the remote control. This may improve the security provided by the movable barrier operator by stopping backward compatibility with communications utilizing the first security protocol from the remote control.

Also provided is a movable barrier operator having a motor configured to be connected to a movable barrier and move the movable barrier. The movable barrier operator includes communication circuitry configured to receive a communication utilizing a first security protocol from a remote control for causing operation of the motor. The communication circuitry is further configured to receive information representative of a second security protocol and to eliminate a compatibility of the communication circuitry with communications utilizing the first security protocol from the remote control. In this manner, the movable barrier operator may be more secure because the remote control no longer transmits using the first security protocol (which may be outdated) and the movable barrier operator no longer responds to communications utilizing the first security protocol from the remote control.

In accordance with another aspect of the present disclosure, a method is provided for updating a first security protocol used by a movable barrier operator and a remote control. The method includes, at a movable barrier operator, receiving information representative of a second security protocol and reconfiguring the movable barrier operator to utilize the second security protocol. The method further includes eliminating a compatibility of the movable barrier operator with communications utilizing the first security protocol from the remote control. Further, the movable barrier operator may be more secure since the movable barrier operator will no longer respond to communications utilizing the first security protocol from the remote control or a criminal's remote control that has misappropriated the identity of the remote control.

A proxy device is provided for updating the security protocol used by a movable barrier operator system including a movable barrier operator and a remote control operable to transmit communications utilizing a first security protocol to the movable barrier operator. The proxy device may be a portable computing device, for example, a smartphone or a tablet computer. The proxy device includes a communication interface configured to facilitate communicating information representative of a second security protocol to the remote control and receiving a first acknowledgment communication indicating the remote control utilizes the second security protocol. The proxy device thereby facilitates the updating of the security protocol utilized by the remote control, particularly when the remote control is located away from its associated movable barrier operator. In one form, the proxy device has a processor running an application and a user interface, such as a touch screen. The user provides a user input to the application indicating the user wants to update the remote control and the proxy device facilitates updating of the security protocol of the remote control.

The proxy device may facilitate the remote control receiving the information representative of the second security protocol in a number of ways. For example, the communication interface of the proxy device may include a short-range transceiver, such as a Bluetooth transceiver, and may transmit the second security protocol information directly to the remote control via short-range communication. The proxy device may receive the first acknowledgment communication indicating the remote control utilizes the second security protocol via the short-range transceiver. In another approach, the communication interface includes a network interface, such as a WiFi transceiver, and may send a request signal to a network entity via a network (e.g., the internet) and the network entity then transmits the information regarding the second security protocol to the remote control via the network. The proxy device may then receive, via the network, the first acknowledgment communication indicating the remote control utilizes the second security protocol.

In one form, the proxy device includes a memory storing a data structure containing information indicating the security protocol utilized by the remote control. Once the communication interface receives the first acknowledgment communication, the data structure is revised to reflect the updated security protocol utilized by the remote control. The proxy device may be used to update a plurality of remote controls together substantially in parallel, or serially one at a time, and the data structure is revised as the remote controls are updated.

In another aspect of the present disclosure, a method is provided for updating security protocols of a movable barrier operator and a remote control. The remote control is operable to transmit communications utilizing a first security protocol to the movable barrier operator. The method includes, at a communication interface of a proxy device, facilitating communication of information representative of a second security protocol to the remote control. The method further includes, at the communication interface, receiving a first acknowledgment communication indicating that the remote control utilizes the second security protocol. The method permits a user to utilize the proxy device to update the security protocol used by one or more remote controls. This may be advantageous if the remote controls are out of communication range with the movable barrier so that the user can bring the proxy device into communication range with the remote control. For example, the proxy device may be a tablet computer and an apartment, condominium, or gated community property manager may carry around the tablet computer to residents' cars to facilitate updating of the remote controls in the cars.

The proxy device may also be used to update the security protocol utilized by the movable barrier operator. The communication interface of the proxy device may communicate information representative of the second security protocol directly to the movable barrier operator by using a wired connection or a wireless such as WiFi, Bluetooth, and ZigBee. The direct connection allows the proxy device to communicate the information to the movable barrier operator if the movable barrier operator is not connected to a network such as the internet. Alternatively or in addition, the communication interface of the proxy device may communicate the information representative of the second security protocol indirectly to the movable barrier operator. The indirect connection may include one or more networks such as a cellular network and the internet.

The present disclosure also provides a method for updating security protocols of a movable barrier operator and a remote control. The remote control is configured to transmit communications utilizing a first security protocol to the movable barrier operator. The method includes transmitting information representative of a second security protocol to a movable barrier operator. The method further includes receiving information indicating that the movable barrier operator has eliminated a compatibility of the movable barrier operator with communications from the remote control utilizing the first security protocol. In this manner, a network entity such as a server computer may update the security protocol utilized by a movable barrier operator and eliminate backward compatibility of the movable barrier operator with communications utilizing the first security protocol from the remote control. In one form, the network entity and/or the movable barrier operator may store information regarding the first security protocol after eliminating the compatibility with the first security protocol in the event it is later desired to revert the movable barrier operator back to the first security protocol.

With reference to FIG. 1, a moveable barrier operator system 10 is shown installed in a garage 12 for moving a moveable barrier, such as a garage door 14, between a first position, such as an open position, and a second position, such as a closed position. The moveable barrier operator system 10 includes a moveable barrier operator 16, a rail 18, and a trolley 20. The movable barrier operator 16 and rail 18 are mounted to a ceiling of the garage 12. The trolley 20 is connected to the garage door 14 and the movable barrier operator 16 has a motor 149 (see FIG. 6) for driving a chain, belt, or screw connected to the trolley 20 and causing movement of the garage door 14. A motor controller 151 having a processor may be provided for controlling operation of the motor 149. The moveable barrier operator system 10 includes at least one remote control, such as a handheld transmitter 22 and a wall mounted switch 24. The transmitter 22 and wall mounted switch 24 may each include a button or buttons that a user actuates to cause the transmitter 22 or wall mounted switch 24 to send a communication to the moveable barrier operator 16 and cause movement of the garage door 14. The moveable barrier operator system 10 includes sensors, such as optical sensors 30 (e.g., infrared photo eyes), connected to the moveable barrier operator 16 by wired 32 or wireless approaches to detect the presence of an object in the path of the garage door 14.

Figure 2:
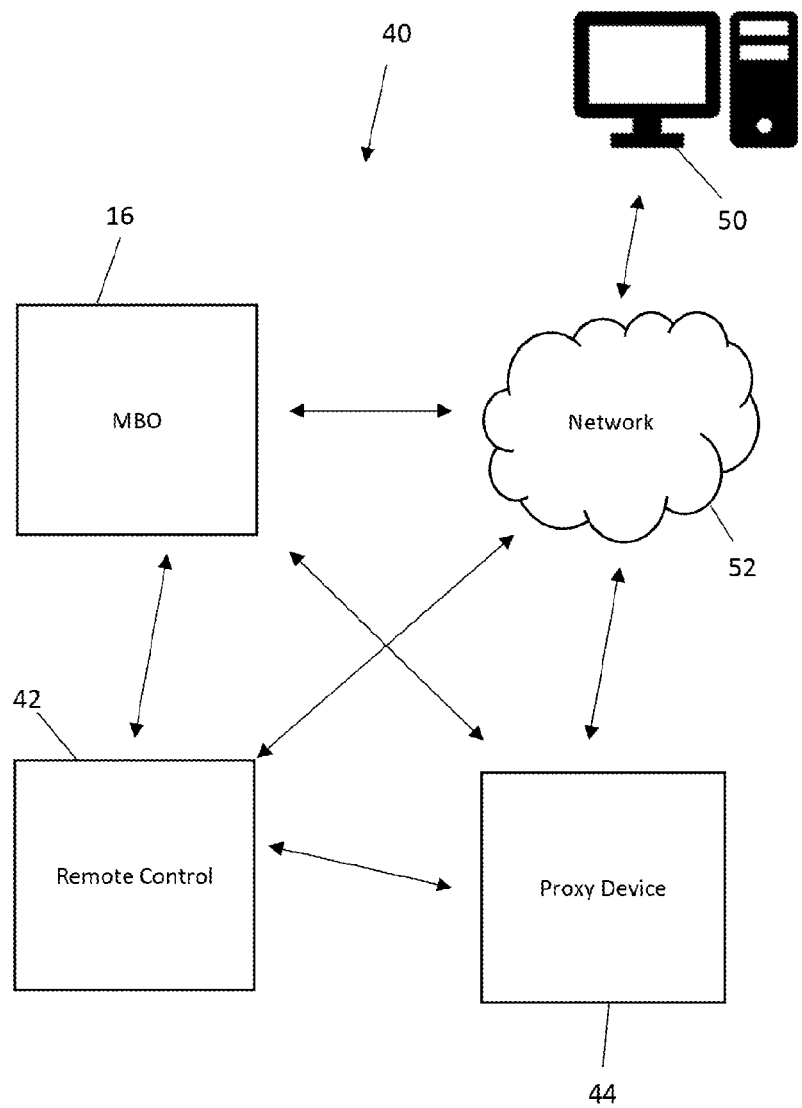
FIG. 2 is a block diagram of an example system including the moveable barrier operator of FIG. 1, the system permitting updating of security protocol used by the moveable barrier operator.

With reference to FIG. 2, an updateable moveable barrier operator system 40 is provided that includes the moveable barrier operator (MBO) 16 and one or more remote controls 42. The remote controls 42 may include the transmitter 22, the wall mounted switch 24, a keypad external to the garage 12, a smartphone running an application to control the movable barrier operator 16 (e.g., a Chamberlain/LiftMaster MyQ® client application), and/or a remote control associated with a vehicle as some examples. The movable barrier operator system 40 permits the security protocol utilized by both the movable barrier operator 16 and the remote controls 42 to be updated without user interaction. In another form, the movable barrier operator system 40 may prompt or otherwise request permission from a user before updating the security protocol used by one or more of the movable barrier operator 16 and the remote controls 42.

The movable barrier operator 16 and remote controls 42 utilize a common security protocol so that the movable barrier operator 16 can receive a communication 100 (see FIG. 3), such as a control signal or a message, from one of the remote controls 42 and determine whether the remote control 42 is authorized to communicate with the movable barrier operator 16. An example of a control signal is a signal transmitted by one of the remote controls 42 that causes the movable barrier operator 16 to operate and move the garage door 14. An example of a message is a message requesting or providing status information regarding the movable barrier operator 16 and/or the garage door 14.

The term security protocol refers to at least one of the characteristics, content (e.g. a fixed portion and/or a variable portion), and parameters of the communication 100 as well as algorithms (or a subset of instructions thereof) utilized by the remote control 42 to produce the communication 100. Similarly, the security protocol may be utilized by the movable barrier operator 16 to determine whether the communication 100 was transmitted by an authorized remote control 42. The security protocol utilized by the movable barrier operator 16 and the remote control 42 may include one or more of the following parameters of the communication 100:

- modulation (e.g., frequency or amplitude);
- physical layer protocol;
- frequency;
- encryption and/or cryptographic method;
- unidirectional or bidirectional communication; and
- multi-factor authentication.

Updating the security protocol of the movable barrier operator 16 and the remote controls 42 may involve updating one or more of these parameters. For example, a fixed or identifying portion 102 and/or a variable portion 104 of the communication 100 may be updated (see FIG. 3).

The remote controls 42 may include the transmitter 22, the wall mounted switch 24, a keypad external to the garage 12, and/or remote controls associated with a vehicle as some examples. Some examples of remote controls associated with a vehicle include a remote control integrated into the dashboard or visor of a vehicle, a remote control in a rear-view mirror of a vehicle, and an infotainment or telematic system of a vehicle. The remote control 42 may also include residence-based electronic devices, such as "intelligent" personal assistants or voice assistants such as the Amazon Echo and Google Home.

Regarding FIG. 2, the system 40 may include one or more proxy devices 44 configured to facilitate the updating of the security protocol utilized by one or more of the movable barrier operator 16 and the remote controls 42. Each proxy device 44 may have a variety of forms such as a laptop computer, a personal computer, a tablet computer, a smartphone, or other computing device. The system 40 further includes a remote resource, such as a network entity 50, that may communicate with one or more of the moveable barrier operator 16, proxy device 44, and remote controls 42 via the network 52. The network 52 may include one or more of the internet, a cellular network, a public switched telephone network, and a power line carrier-based network as some examples. The network entity 50 is physically discrete from, and geographically removed from, the movable barrier operator 16 and the remote controls 42. This distance may be more than one mile, more than several miles or even separation measured by different time zones.

Figure 3:
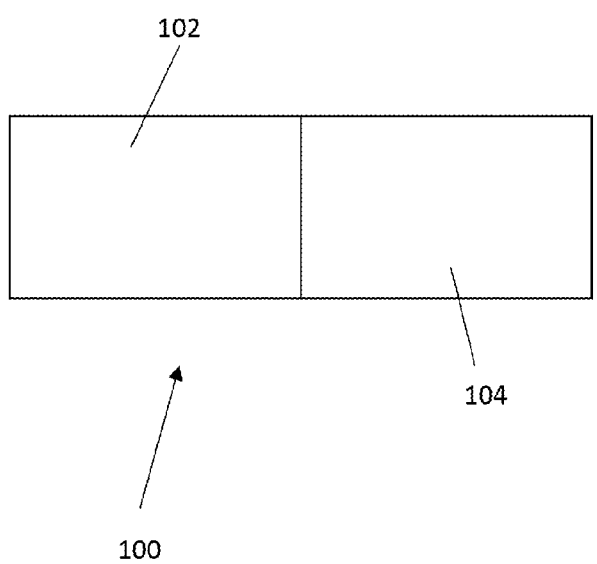
FIG. 3 is a schematic representation of an example communication from a remote control authorized to operate the movable barrier operator of FIG. 1.

With reference to FIG. 3, the remote controls 42 may each transmit the communication 100 in response to user actuation of the remote control 42. The user may actuate the remote control 42 by, for example, pushing a button of the remote control 42, using voice commands, or making hand gestures (e.g., swiping and/or tapping) on or in proximity to the remote control 42. Each communication 100 may comport with a rolling code security protocol and include the fixed or identifying portion 102 identifying the remote control 42 and a variable portion 104 that changes with each manipulation of the remote control 42. The movable barrier operator 16 and the remote controls 42 utilize a common security protocol for transmission and reception of communication 100 so that the movable barrier operator 16 can determine whether the communication 100 transmitted from a remote control 42 has originated at an authorized remote control 42.

The remote controls 42 may implement various encryption techniques, such as a rolling code technique, wherein the variable portion 104 changes with each manipulation of the remote control 42. The shared security protocol between the movable barrier operator 16 and the remote control 42 permits the movable barrier operator 16 to verify whether the communication 100 and its components were produced by an authorized remote control 42 using the shared security protocol despite the changing of the variable portion 104 of the communication 100 with each manipulation of the remote control 42.

The communication 100 may propagate or be communicated in a single direction, such as from the remote control 42 to the movable barrier operator 16. In another form, the communication 100 is bidirectional and has two components: a first signal sent from the remote control 42 to the movable barrier operator 16 and a second signal sent from the movable barrier operator 16 to the remote control 42. Two-way communications may increase the security of the communication 100. Two-way communication may also be used to provide features like door status or an indication that a delivery person opened a barrier associated with the movable barrier operator 16.

Figure 4:
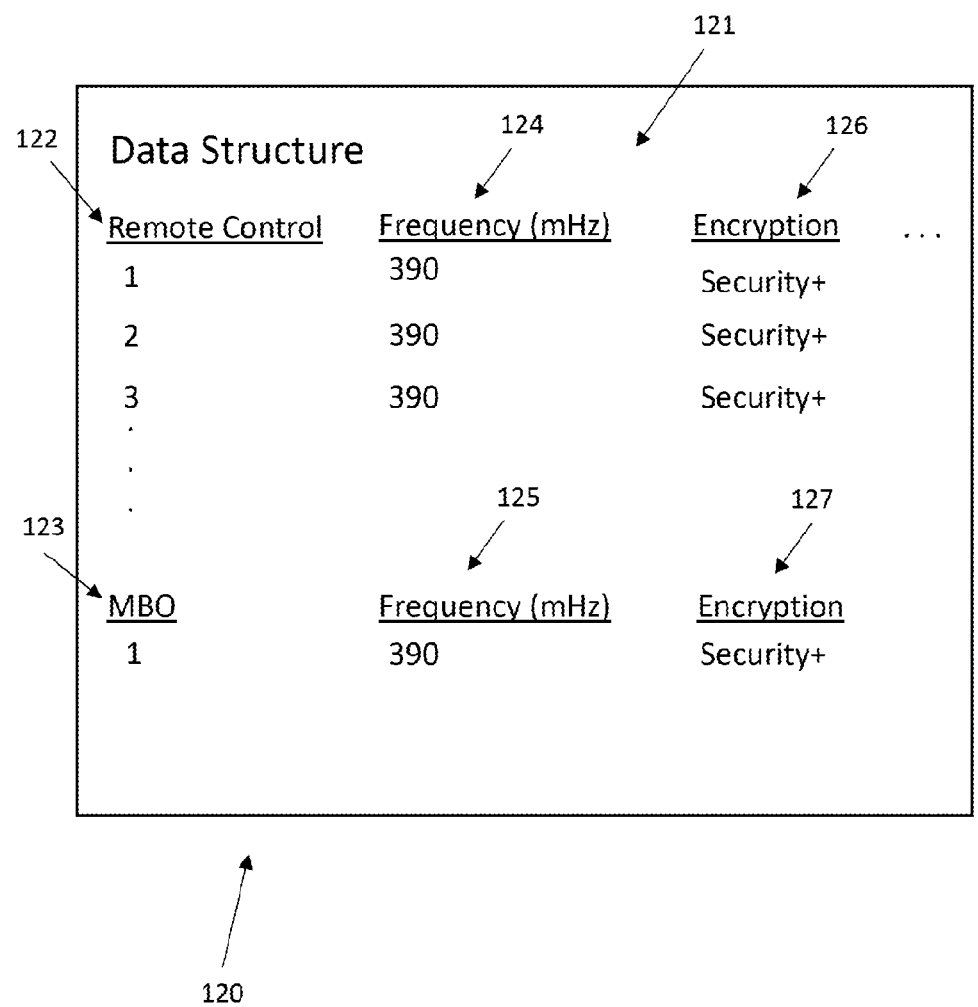
FIG. 4 is an example of a data structure for tracking the security protocols utilized by the movable barrier operator of FIG. 1 and its associated remote controls.

With reference to FIG. 4, one or more of the moveable barrier operator 16, proxy device 44, network entity 50 and/or a computer associated with the network 52 may maintain a data structure 120 that tracks the security protocol used by the movable barrier operator 16 and the associated remote controls 42. The data structure 120 includes a remote control identifier 122 for each remote control 42, a movable barrier operator identifier 123, and security protocol information 121 for the remote controls 42 and movable barrier operator 16. The security protocol information 121 may include various information or parameters, such as frequencies 124 utilized by the remote control 42, encryption techniques 126 utilized by the remote control 42, a frequency 125 used by the movable barrier operator 16, and the encryption technique 127 used by the movable barrier operator 16.

The data structure 120 may reside in multiple instances (locations or entities) including the movable barrier operator 16, proxy device 44, and network entity 50. The information stored in the data structure 120 may be synchronized across the instances. Upon occurrence of a change to information in the data structure 120, the information change is propagated throughout the system 10. This ensures consistency and up-to-date information at each of the instances.

For the data structure 120 shown in FIG. 4, the three remote controls 42 each transmit their communication 100 at a frequency of 390 mHz and use the Security+ encryption technique. The data structure 120 also indicates that the movable barrier operator 16 utilizes a frequency of 390 MHz and the Security+ encryption technique to receive and decode the communication 100. As illustrated in FIG. 4, the remote controls 1-3 and movable barrier operator 16 are configured to communicate with each other since a common frequency and encryption technique are used. To this end, it can be appreciated that the data structure 120 facilitates reconciliation of which remote controls are configured to communicate or otherwise operate with which movable barrier operator and vice versa.

In another form, there may be two or three movable barrier operators 16 to open two or three garage doors with each movable barrier operator 16 having its own associated remote controls 42. The data structure 120 may include information organized hierarchically according to door or movable barrier operator regarding all of the movable barrier operators 16 and their associated remote controls 42 and security protocols. In another form, there may be a separate data structure for each movable barrier operator 16 and its remote controls 42. In some instances, the data structure 120 may be configured as linked tables or a relational database.

In one form, the moveable barrier operator 16 includes a memory 150 (see FIG. 6) that stores the data structure 120 and tracks the security protocol utilized by the moveable barrier operator 16 and the remote controls 42 that are paired to, learned by, or otherwise associated with the moveable barrier operator 16. From time to time, an entity such as the owner, property manager, or the manufacturer may desire to update the security protocol utilized by the moveable barrier operator 16 and the remote controls 42. This may be done to update the security protocol to a different, new, or more secure encryption technique. For example, the network entity 50 may be a server computer operated by a manufacturer of the moveable barrier operator 16 and may transmit, via the network 52, information to the moveable barrier operator 16, the remote controls 42, and/or the proxy device 44 to update the security protocol utilized by the moveable barrier operator 16 and the remote controls 42.

Figure 6:
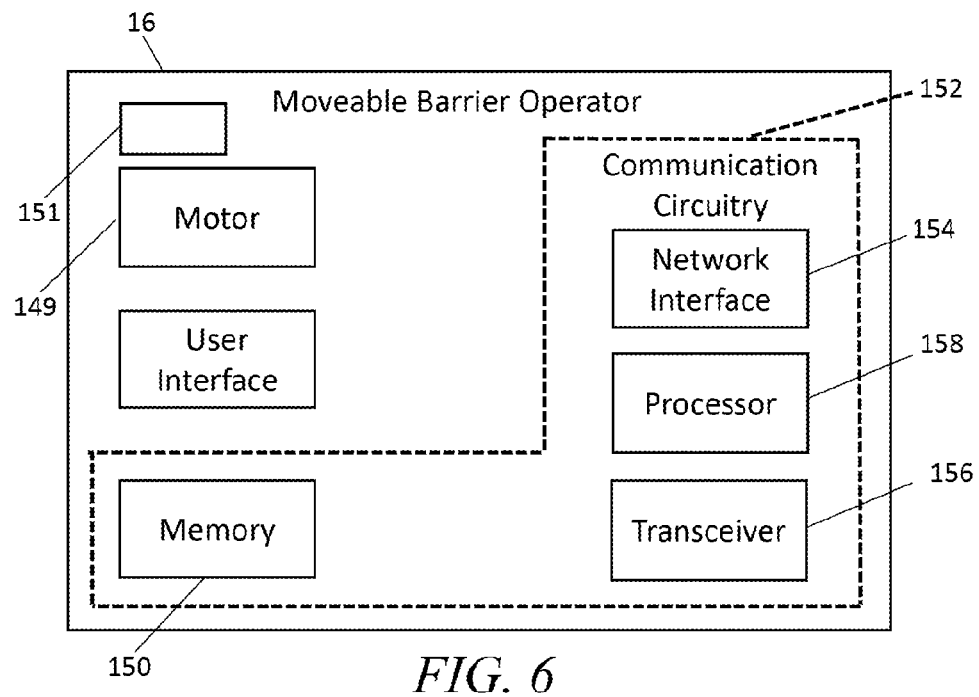
FIG. 6 is an example block diagram of the movable barrier operator of FIG. 1.

With reference to FIG. 6, the moveable barrier operator 16 may include communication circuitry 152 that includes a network interface 154 for communicating with the network 52, a transceiver 156 for communicating with the remote controls 42, and a processor 158. In response to the moveable barrier operator 16 receiving the information regarding the second security protocol via the network interface 154, the processor 158 may facilitate providing information regarding the second security protocol to the remote controls 42.

Figure 7:
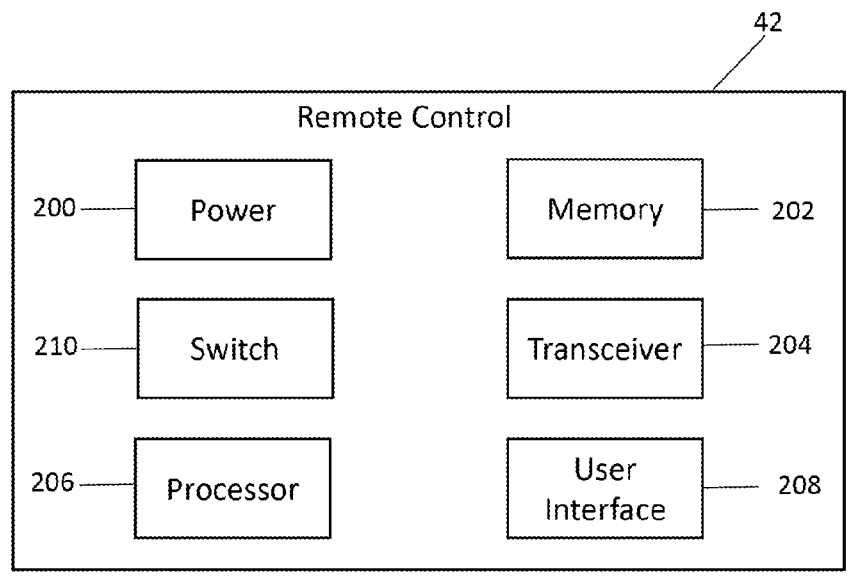
FIG. 7 is an example block diagram of a remote control of the system of FIG. 2.

With reference to FIG. 7, the remote controls 42 may each include one or more of a power source 200, a memory 202 a transceiver 204, a processor 206, user interface 208, and a switch 210. The user interface 208 may include a button, and the switch 210 may close in response to operation of the button to provide power from the power source 200 to the other components of the remote control 42.

In response to the transceiver 204 of the remote control 42 receiving the information regarding the second security protocol, the remote control processor 206 may reconfigure the remote control 42 to utilize the second security protocol. As an example, reconfiguration may involve rewriting or updating information stored in the memory 202 and/or processor 206 regarding the first security protocol, such as values or algorithms. The information regarding the first security protocol may be stored in the memory 202 in the event it is desired to revert back to the first security protocol.

Once the remote control 42 has been updated to utilize the second security protocol, the processor 206 operates the transceiver 204 to provide an acknowledgement communication to the moveable barrier operator 16 indicating that the remote control 42 has updated to the second security protocol. The acknowledgement communication may be in the form of a separate communication produced in response to the processor 206 completing the updating of the security protocol. In another approach, the acknowledgment communication may be a command signal transmitted by the transceiver 204 utilizing the second security protocol instead of the first security protocol from which the moveable barrier operator 16 is able to infer that the remote control 42 has been updated. The moveable barrier operator 16 recognizes the communication 100 transmitted using the second security protocol as confirmation that the remote control 42 has been updated to the second security protocol.

The processor 158 of the moveable barrier operator 16 may then update the data structure 120 each time the moveable barrier operator 16 receives an acknowledgement from one of the remote controls 42 indicating that the remote control 42 has updated to the second security protocol. As shown in FIG. 5, the moveable barrier operator 16 has received acknowledgment communications from the remote controls 42 and has updated the data structure 120 to reflect that the remote controls 42 now utilize the second security protocol e.g., a 315 MHz frequency and the Security+2.0 encryption technique. Once the moveable barrier operator 16 receives the acknowledgement from each one (or substantially all, or a majority, or a critical mass, or a predetermined quantity) of the remote controls 42, the moveable barrier operator 16 may then eliminate the compatibility of the moveable barrier operator 16 with the communications 100 that utilize the first security protocol from the remote control 42. The moveable barrier operator 16 may thereby not operate in response to receiving a communication 100 utilizing the first security protocol from a remote control 42 once the remote control 42 has been updated to the second security protocol.

For example, the movable barrier operator 16 may eliminate its compatibility for communications 100 utilizing the first security protocol by adding, deleting, and/or overwriting information in the memory 150 and/or processor 158 regarding the first security protocol such as values and/or programs. In another form, the processor 158 may facilitate storing the information regarding the first security protocol in the memory 150 so as to permit the movable barrier operator 16 to revert back to the first security protocol if desired at a later time.

The movable barrier operator 16 may eliminate its compatibility with communications 100 utilizing the first security protocol after all of the remote controls 42 have provided an acknowledgment that the remote controls 42 now utilize the second security protocol. In another approach, the movable barrier operator 16 eliminates its compatibility with the communications 100 from each remote control 42 in response to the movable barrier operator 16 receiving an acknowledgment that the remote control 42 utilizes the second security protocol. If the movable barrier eliminates its compatibility with one remote control 42 at a time, the movable barrier operator 16 may move the garage door 14 in response to receiving a communication 100 from a first remote control 42 that has been updated to the second security protocol and may move the garage door 14 in response to receiving a communication 100 from a second remote control 42 that has not yet completed its update to the second security protocol. For example, the first remote control 42 may be an updatable keypad outside of the garage door 14 and the second remote control 42 may be non-updatable transmitter in the dashboard or mirror of a vehicle. The movable barrier operator 16 may preserve the operability of the movable barrier operator 16 with the non-updatable transmitter utilizing the first security protocol for the remaining lifetime of the non-updatable transmitter while no longer responding to communications from the updatable keypad according to the first security protocol.

Figure 8:
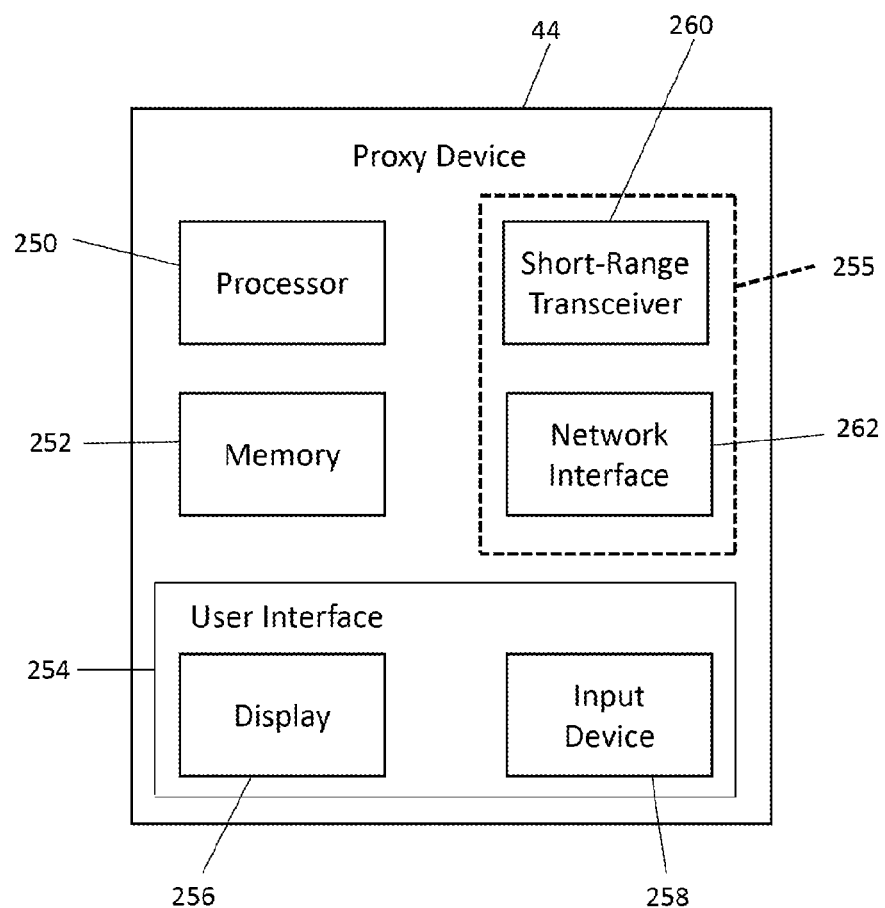
FIG. 8 is an example block diagram of a proxy device of the system of FIG. 2.

With reference to FIG. 8, the proxy device 44 may include a processor 250, a memory 252, a user interface 254, and a communication interface 255. The user interface 254 may include a display 256 and an input device 258. In one form, the user interface 254 is a touch screen of the proxy device 44 and the input device 258 includes one or more buttons displayed on the touch screen. The input device 258 may include one or more physical buttons that may be depressed.

The communication interface 255 may include a short-range transceiver 260, such as a transceiver utilizing Bluetooth, Bluetooth Low Energy, infrared, Near Field Communication (NFC), ZigBee, and/or WiFi approaches. The communication interface 255 may also include a network interface 262 configured for interfacing with the network 52. The network interface 262 may include, for example, a cellular phone transceiver and antenna configured to communicate using approaches such as 3G, 4G, LTE, LTE-A and 5G.

In one approach, the proxy device 44 facilitates updating of the remote controls 42. For example, the data structure 120 may be stored in the memory 252 of the proxy device 44. The proxy device 44 may receive information regarding the second security protocol from the network entity 50 via the network 52. The proxy device 44 may provide information to the remote controls 42 for updating the remote controls 42 to the second security protocol. The remote controls 42 may then provide an acknowledgement to the proxy device 44 indicating that the remote controls 42 have been updated to the second security protocol. Once the proxy device 44 receives update acknowledgements from the remote controls 42, the proxy device 44 may provide acknowledgement to the moveable barrier operator 16 and/or the network entity 50 indicating that the remote controls 42 have been updated to the second security protocol.

The proxy device 44 may also facilitate updating of the movable barrier operator 16. In one embodiment, the proxy device 44 sends information regarding the second security protocol directly to the moveable barrier operator 16. The proxy device 44 may thereby provide the movable barrier operator 16 with information regarding the second security protocol even if the movable barrier operator 16 is not connected to the network 52. In another embodiment, the moveable barrier operator 16 may be connected to the network 52 and the proxy device 44 provides information regarding the second security protocol indirectly to the movable barrier operator 16 via the network 52. In one form, the proxy device 44 receives an update acknowledgement from the movable barrier operator 16 and provides an acknowledgment to the network entity 50 indicating that the movable barrier operator 16 has been updated to the second security protocol.

If the data structure 120 is stored in the memory 252 of the proxy device 44, the processor 250 may cause the data structure 120 to be updated to indicate the movable barrier operator 16 and remote controls 42 utilize the second security protocol. It will be appreciated that the tracking of the security protocol utilized by the movable barrier operator 16 and remote controls 42 may be performed using different techniques. For example, the proxy device 44 may track the security protocol utilized by the movable barrier operator 16 and the movable barrier operator 16 may track the security protocol utilized by the remote controls 42. The movable barrier operator 16 and the proxy device 44 may each provide security protocol information to the network entity 50.

With reference to FIGS. 9-13, example methods 300, 400, 500, 600, 700 are provided that may be implemented by the system 40 to update the security protocol utilized by the movable barrier operator 16 and the remote controls 42.

Figure 9:
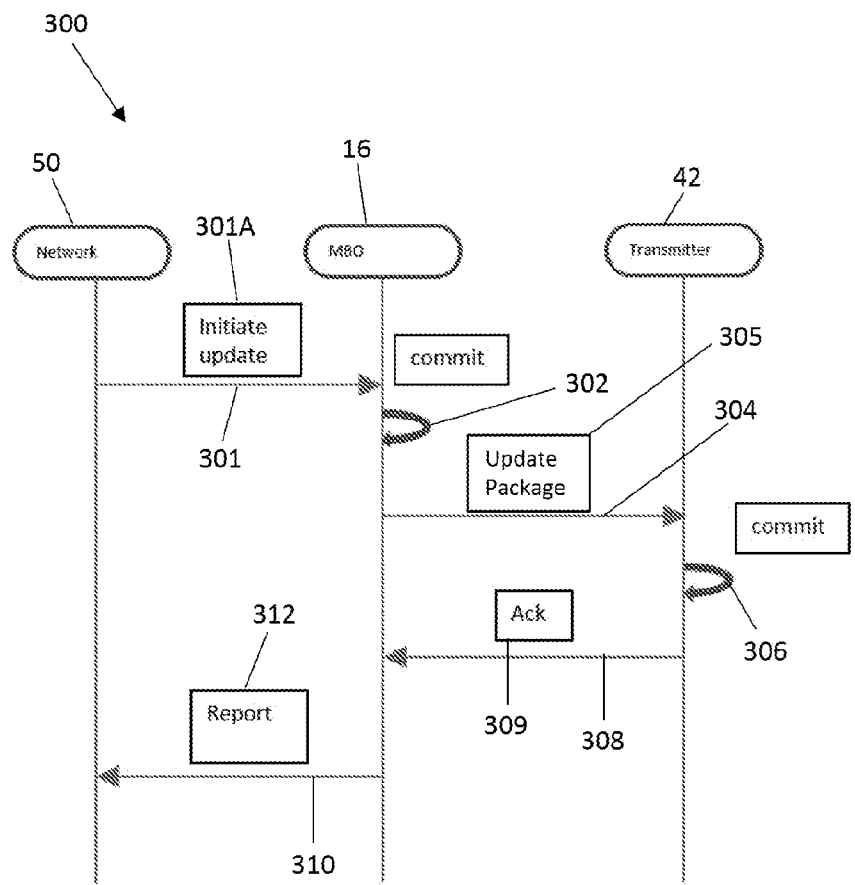
FIG. 9 is a flow diagram of an example process of updating the security protocol utilized by a moveable barrier operator and a transmitter.

With reference to FIG. 9, the method 300 is provided for updating the security protocol utilized by the moveable barrier operator 16 (shown as "MBO") and one of the remote controls 42 (shown as "transmitter"). Although one remote control 42 is illustrated, the method 300 could entail the updating of two or more remote controls 42. In the method 300, the moveable barrier operator 16 monitors or tracks the security protocol utilized by the remote controls 42 such as by storing the data structure 120 in the memory 150. Initially, a remote resource such as a network entity 50 transmits 301 an update package 301A to the moveable barrier operator 16 for initiating an update of the security protocol of the movable barrier operator 16 and the remote control 42 from a first security protocol to a second security protocol. The moveable barrier operator 16 receives the update package 301A and commits 302 to the update of the first security protocol to the second security protocol. In some instances, after receiving and committing 302 to the update package 301A, the movable barrier operator 16 may operate according to both of the first security protocol and the second security protocol. Such a dual security protocol operation may continue until it is determined by at least one of the movable barrier operator 16, the proxy device 44, and the network entity 50 that substantially all, most of, a critical mass, or a predetermined quantity of remote controls 42 are updated to the second security protocol as indicated by the data structure 120. The movable barrier operator 16 may review the package 301A transmitted 301 from the network entity 50 to determine, for example, whether the second security protocol is compatible with the movable barrier operator 16. In one approach, the moveable barrier operator 16 may send a signal to the network entity 50 indicating that the moveable barrier operator 16 is committing 302 to the update or is declining the update.

Once the movable barrier operator 16 has committed 302, the moveable barrier operator 16 transmits 304 an update package 305 to the remote control 42. The update package 305 may be sent by push or pull techniques. For example, the movable barrier operator 16 may push the update package 305 to the remote control 42 when the remote control 42 is within range of the movable barrier operator 16. As example of a pull approach, when a user manipulates the remote control 42 to cause the moveable barrier operator 16 to open the garage door 14, the remote control 42 could initiate a bidirectional communication to check whether there is a security protocol update for the remote control 42. The bidirectional communication may have different properties than the communication 100, such as by utilizing WiFi or Bluetooth whereas the communication 100 utilizes a radio frequency at 315 MHz for example. If the movable barrier operator 16 indicates there is a security protocol update available, the remote control 42 obtains the update package 305 from the movable barrier operator 16.

The remote control 42 could obtain the update package 305 in other ways. For example, the movable barrier operator 16 could provide the remote control 42 with an update token which the remote control 42 uses to obtain the update package 305 from a device external to the remote control 42, e.g., the network entity 50 via the proxy device 44.

Once the remote control 42 receives the update package 305, the remote control 42 may commit 306 to updating the security protocol from the first security protocol to the second security protocol. The remote control 42 may commit 306 to updating the security protocol once the remote control 42 has been within range of the movable barrier operator 16 for a predetermined period of time. The remote control 42 may alternatively commit to the update package 305 based on at least one determination that the remote control 42: has been stationary (e.g., as sensed by an accelerometer or gyroscope); and proximate to the movable barrier operator 16 (e.g., as determined based on received signal strength indication (RSSI) or the like). This may allow the remote control 42 to receive all of the information needed for the update before the remote control 42 starts the update.

The remote control 42 updates to the second security protocol and transmits 308 an acknowledgement communication 309 to the moveable barrier operator 16. The transmitter 42 may transmit 308 the acknowledgment communication 309 once the remote control 42 has completed the update. In another approach, the remote control 42 may transmit 308 the acknowledgment communication 309 before or during the updating process.

The movable barrier operator 16 receives the acknowledgment communication 309, and in response to the receiving the acknowledgment communication 309, may perform at least one of updating the communication circuitry 152 to the second security protocol (if not already completed at committing operation 302), and eliminating the compatibility of the communication circuitry 152 with communications 100 utilizing the first security protocol from the remote control 42. The moveable barrier operator 16 transmits 310 a report 312 to the network entity 50 indicating that the moveable barrier operator 16 and the remote control 42 have been updated to the second security protocol. Further, the moveable barrier operator 16 may update the data structure 120 stored in the memory 150 to reflect that the remote control 42 has been updated to the second security protocol.

Various factors may be taken into account when configuring the transmissions 301, 304 of the packages 301A, 305 as well as activation thereof. Depending on the update to be performed, the movable barrier operator 16 and/or the remote control 42 could select one or more communication paths to achieve a suitable bandwidth/throughput for the entirety or part of the update package. One or more sensors, such as an accelerometer or gyroscope at the remote control 42 could detect movement which would cause delay, pause, or prevention of the update procedure.

Figure 10:
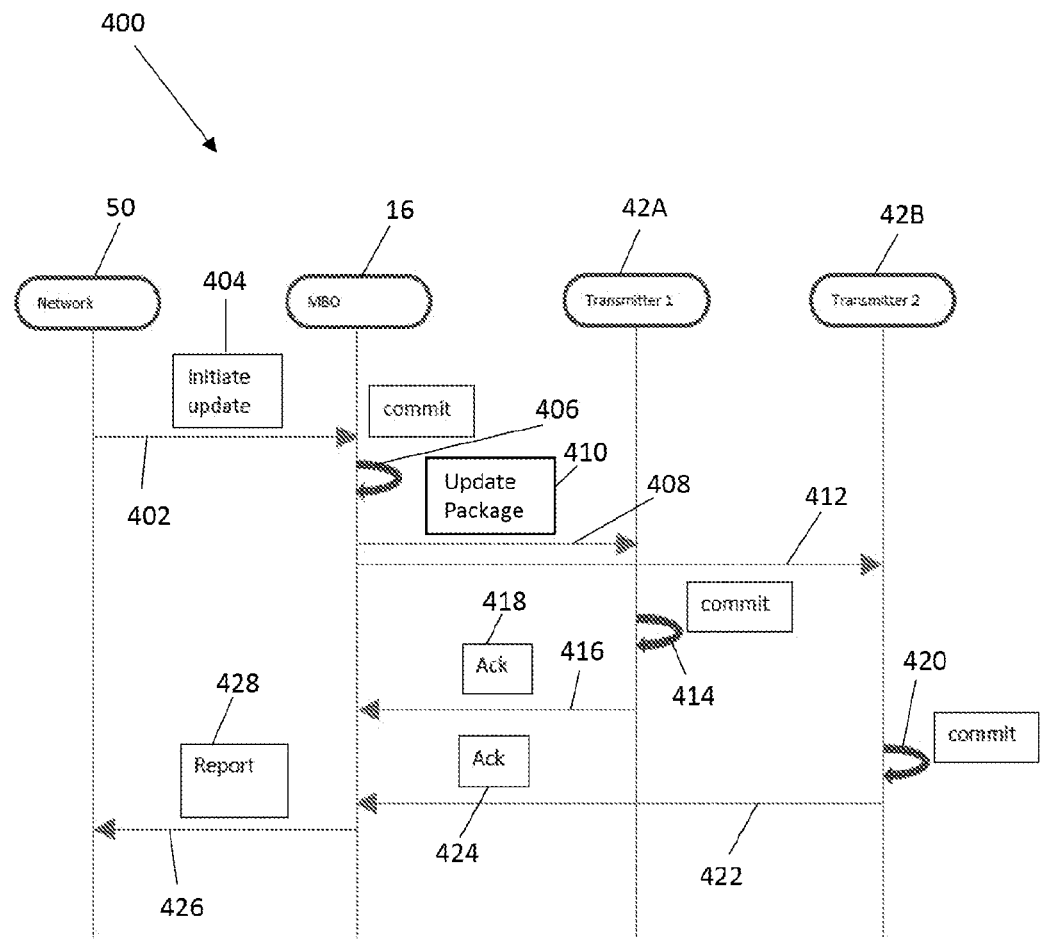
FIG. 10 is a flow diagram of an example process for updating the security protocol utilized by a moveable barrier operator and a pair of transmitters.

With reference to FIG. 10, the method 400 is provided for updating the movable barrier operator 16 and remote controls 42A, 42B from a first security protocol to a second security protocol. Like the method 300, the movable barrier operator 16 in the method 400 monitors or tracks the security protocol utilized by the remote controls 42A, 42B such as by storing the data structure 120 in the memory 150.

Initially, the network entity 50 transmits 402 an update package 404 to the movable barrier operator 16. The moveable barrier operator 14 receives the update package 404 and commits 406 to updating the security protocol of the moveable barrier operator 16. The moveable barrier operator 16 transmits 408 an update package 410 to the remote control 42A. The moveable barrier operator 16 also transmits 412 the update package 410 to the remote control 42B. In another form, the movable barrier operator 16 may transmit the update package 410 to the remote control 42A and the remote control 42A acts as a proxy device and provides the update package 410 to the other remote control 42B.

The remote control 42A commits 414 to the update and transmits 416 an acknowledgment communication 418 to the moveable barrier operator 16. The remote control 42B commits 420 and transmits 422 an acknowledgment communication 418 to the moveable barrier operator 16. The movable barrier operator 16 updates the communication circuitry 152 to utilize the second security protocol and eliminates the compatibility of the communication circuitry 152 with communications 100 utilizing the first security protocol from the remote controls 42A, 42B.

The moveable barrier operator 16 transmits 426 a report 428 to the network entity 50 indicating that the moveable barrier operator 16 and the remote controls 42A, 42B have been updated from the first security protocol to the second security protocol. The moveable barrier operator 16 may update the data structure 120 (or otherwise cause the network entity 50 to update the data structure 120 according to the report 428) to reflect that the remote controls 42A, 42B have both been updated to the second security protocol.

Figure 11:
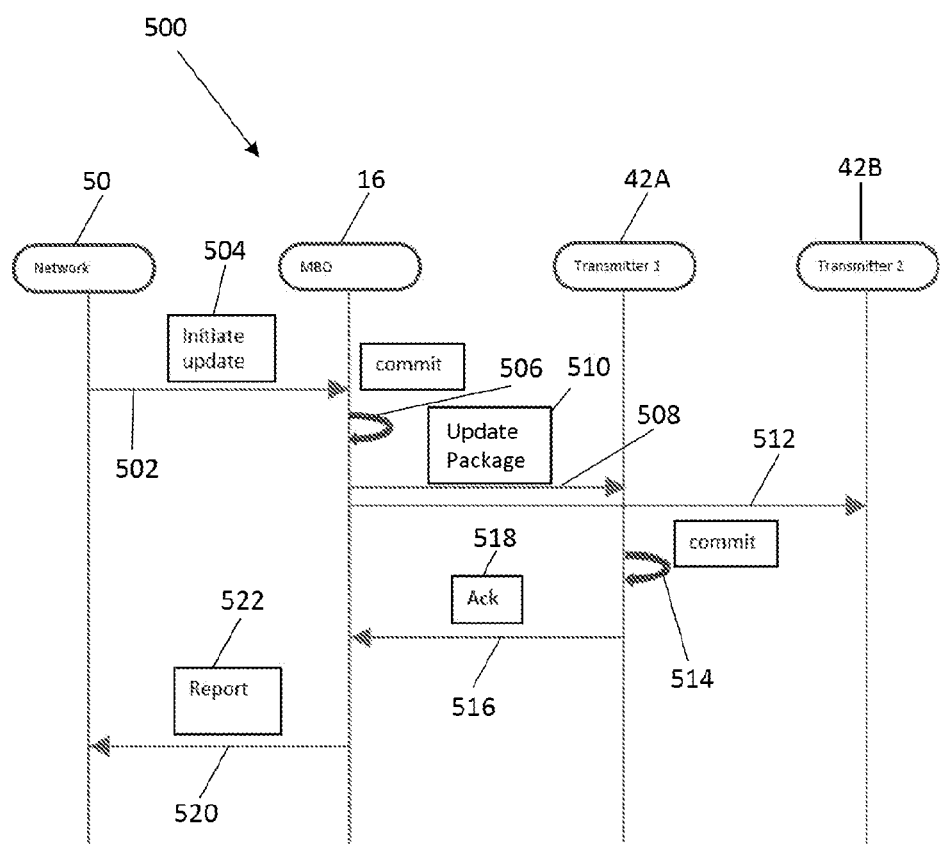
FIG. 11 is a flow diagram similar to FIG. 10 except that the second transmitter is not updated.

With reference to FIG. 11, the method 500 is provided that is similar in many respects to the method 400 discussed above. The method 500 illustrates a situation where the remote control 42B is unable to update to utilize the second security protocol. More specifically, the network entity 50 transmits 502 an update package 504 to the moveable barrier operator 16. The moveable barrier operator 16 commits 506 to the updating the communication circuitry 152 to utilize the second security protocol. The moveable barrier operator 16 transmits 508 an update package 510 to the remote control 42A and transmits 512 the update package 510 to the remote control 42B. The remote control 42A commits 514 to the update and transmits 516 an acknowledgement 518 to the moveable barrier operator 16. The remote control 42B, however, is unable to commit to the update from the first to the second security protocol. For example, the remote control 42B may be associated with a vehicle that was parked in a garage associated with the moveable barrier operator 16, and the vehicle has left the garage before the remote control 42B received all the information required to update from the first to the second security protocol. In this situation, the moveable barrier operator 16 may update the communication circuitry 152 to utilize the second security protocol with respect to communications 100 received from the remote control 42A. The movable barrier operator 156 transmits 520 a report 522 to the network entity 50 indicating that the moveable barrier operator 16 and the remote control 42A have been updated to the second security protocol. The report 522 may also include information indicating the remote control 42B continues to utilize the first security protocol.

To preserve the ability of the remote control 42B to operate the moveable barrier operator 16, the moveable barrier operator 16 may not eliminate the capability of the moveable barrier operator 16 to operate in response to control signals received using the first security protocol if the control signals are sent from the remote control 42B. In other words, the moveable barrier operator 16 may preserve the ability of the moveable barrier operator 16 to operate with the communications 100 utilizing the first security protocol from the remote control 42B. For example, the communication circuitry 152 may keep the first security protocol in the memory 150 to provide backwards compatibility with the remote control 42B until the remote control 42B completes its update to the second security protocol. Once the vehicle returns to the garage 12, the remote control 42B may continue receiving the information regarding the second security protocol needed to complete the update of the remote control 42B to the second security protocol.

In one approach, the movable barrier operator 16 may not eliminate compatibility of the movable barrier operator 16 with communications 100 from any of the remote controls 42 until all of the remote controls 42A, 42B have acknowledged they have received and updated to the second security protocol.

In one approach, the network entity 50 may send a signal to the proxy device 44 indicating that not all of the remote controls 42 have been updated. The proxy device 44 may then display a prompt to the user and ask whether to eliminate compatibility of the moveable barrier operator 16 with respect to communications 100 utilizing the first security protocol. This provides the opportunity for a user, such as a facility manager, to decide whether to convert the barrier operator 16 to utilize the secondary security protocol. Furthermore when the data structure 120 is stored on or accessible via the proxy device 44 in a human-readable format (e.g., a graphical user interface), the facility manager may contact the persons associated with the non-updated remote controls 42 and get the remote controls 42 updated. The network entity 50 may alternatively send an email to a user providing an indication that not all of the remote controls 42 have been updated.

The movable barrier operator 16 may eliminate compatibility of the movable barrier operator 16 with communications 100 utilizing the first security protocol after a predetermined time period. For example, the movable barrier operator 16 may set a time period of a month after committing 506 to the update. If the movable barrier operator 16 controlled the entrance to an apartment complex, this time period would give residents time to update their remote controls 42 as the users enter and exit the complex.

The movable barrier operator 16 may eliminate the compatibility of the movable barrier operator 16 with communications 100 utilizing the first security protocol after a critical mass or predetermined quantity of remote controls 42 have acknowledged their updating to the second security protocol. The critical mass of remote controls 42 may be, for example, fifty percent, sixty percent, seventy percent, eighty percent, or ninety percent of the remote controls 42.

Figure 12:
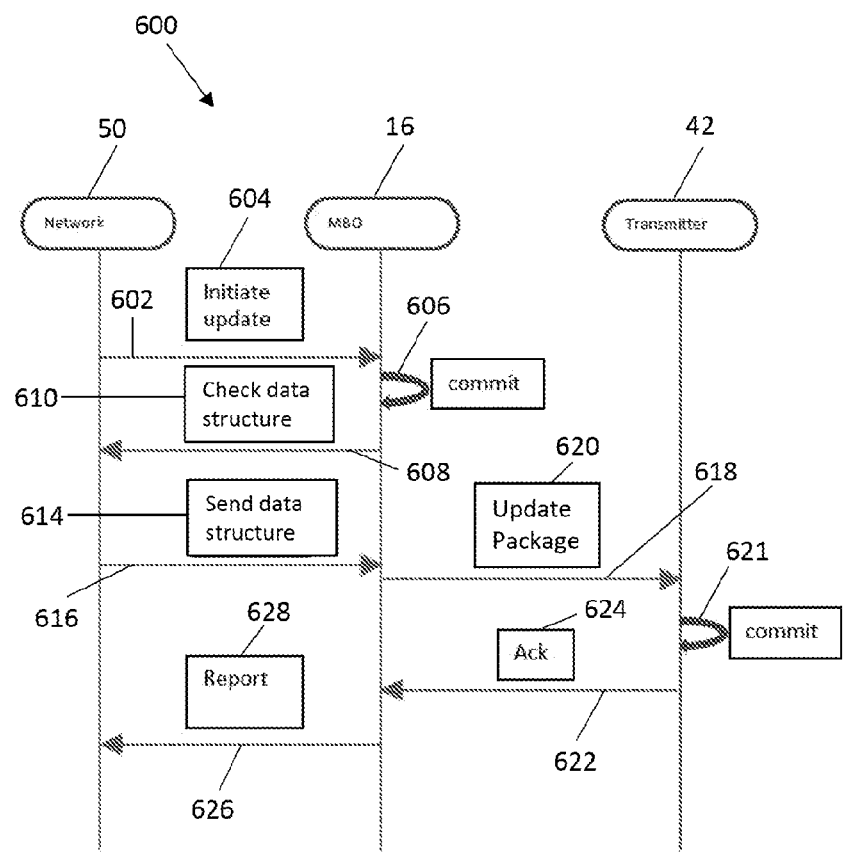
FIG. 12 is a flow diagram showing an example process for updating security protocol utilized by a moveable barrier operator and a transmitter wherein a network entity maintains a data structure for tracking the security protocols utilized by the movable barrier operator and the transmitter.

With respect to FIG. 12, the method 600 is provided wherein the network entity 50 tracks the security protocol used by the remote controls 42. Initially, the network entity 50 transmits 602 a package 604 via the network 52 to the moveable barrier operator 16, wherein the package 604 is configured to initiate an update of the security protocol used by the movable barrier operator 16 and remote controls 42. The moveable barrier operator 16 commits 606 to the security protocol update and transmits 608 a check data structure message, query or package 610 to the remote resource 50. The check data structure package 610 contains a request for data structure information regarding the security protocol utilized by the remote controls 42.

The network entity 50 transmits 616 a data structure package 614 containing information from the data structure 120. The moveable barrier operator 16 reviews the information contained in the data structure package 616 and transmits 618 an update package 620 based at least in part on the initiate update package 604 to the remote control 42. The remote control 42 commits 621 to the update and updates the security protocol utilized by the transceiver 204. The remote control 42 transmits 622 an acknowledgement 624 to the moveable barrier operator 16. With the remote control 42 updated, the movable barrier operator 16 updates the communication circuitry 152 to utilize the second security protocol. The moveable barrier operator 16 transmits 626 a report 628 to the network entity 50 via the network 52. The report 628 indicates that the moveable barrier operator 16 and the remote control 42 have been updated from the first to the second security protocol.

Figure 13:
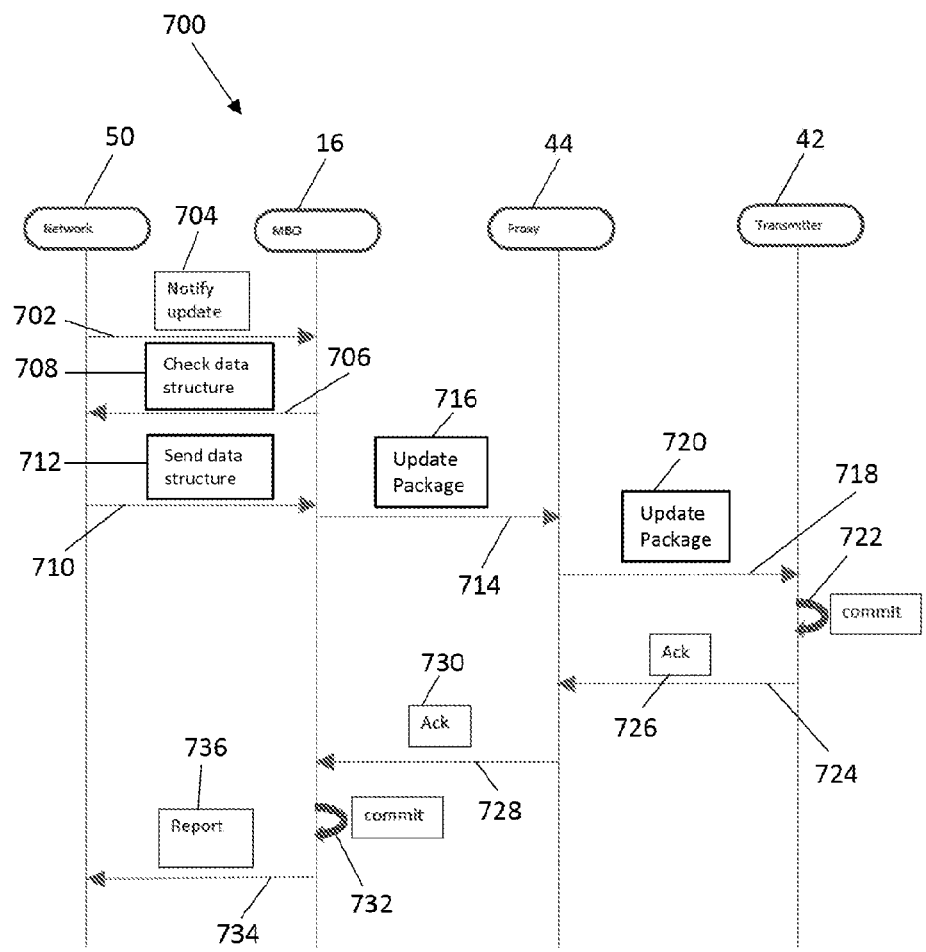
FIG. 13 is a flow diagram showing an example process for updating security protocol utilized by a moveable barrier operator and a transmitter wherein a proxy device facilitates updating of the transmitter.

With reference to FIG. 13, the method 700 is provided wherein the network entity 50 tracks the security protocol utilized by the remote controls 42 and, optionally, the movable barrier operator 16. The method 700 also includes the proxy device 44 facilitating updating of the remote control 42 from a first security protocol to a second security protocol. The network entity 50 transmits 702 a notify update package 704 to the moveable barrier operator 16. The moveable barrier operator 16 transmits 706 a check data structure request, or query 708 to the network entity 50. The network entity 50 transmits 710 a data structure package 712 to the moveable barrier operator 16. The moveable barrier operator 16 may review the data structure 712 and determine which remote controls 42 are to be updated. The moveable barrier operator 16 then transmits 714 an update package 716 to the proxy 44. The proxy device 44 transmits 718 an update package 720 to the remote control 42. The remote control 42 commits 722 and transmits 724 an acknowledgement 726 to the proxy device 44. The proxy device 44 then transmits 728 an acknowledgement 730 to the moveable barrier operator 16. Once the moveable barrier operator 16 has received the acknowledgement 730 from the proxy device 44, the moveable barrier operator 16 commits 732 to the update of the communication circuitry 152 of the moveable barrier operator 16 from the first security protocol to the second security protocol. The moveable barrier operator 16 then transmits 734 a report 736 to the network entity 50 via the network 52 indicating that the moveable barrier operator 16 and the remote control 42 have been updated.

It will be appreciated that movable barrier operator 16, one or more remote controls 42, one or more proxy device 44, and one or more network entities 50 may each include one or more hardware processors configured by machine-readable instructions. One or more non-transitory computer readable mediums may be provided that include instructions that are used by the processors to perform the methods discussed above.

Although method steps may be presented and described herein in a sequential fashion, one or more of the steps shown and described may be omitted, repeated, performed concurrently, and/or performed in a different order than the order shown in the figures and/or described herein. Those skilled in the art will recognize that a wide variety of modifications, alterations, and combinations can be made with respect to the above described examples without departing from the scope of the invention, and that such modifications, alterations, and combinations are to be viewed as being within the ambit of the inventive concept.

What is claimed is:

1. A system for moving a movable barrier between a first position and a second position, the system including:
a movable barrier operator configured to be connected to the movable barrier and move the movable barrier between the first position and the second position; and
a remote control configured to utilize a first security protocol to wirelessly transmit a communication to the movable barrier operator;
the movable barrier operator further configured to receive information representative of a second security protocol and to eliminate a compatibility of the movable barrier operator with communications utilizing the first security protocol from the remote control.

2. The system of claim 1 wherein the remote control includes a transceiver configured to receive information representative of the second security protocol and to transmit a communication utilizing the second security protocol; and
the movable barrier operator is configured to eliminate the compatibility of the movable barrier operator with communications from the remote control utilizing the first security protocol in response to the movable barrier operator receiving the communication from the remote control utilizing the second security protocol.

3. The system of claim 1 wherein the remote control includes a transceiver configured to receive information representative of the second security protocol and to transmit an acknowledgment communication to the movable barrier operator indicating the remote control utilizes the second security protocol; and
the movable barrier operator is configured to eliminate the compatibility of the movable barrier operator with communications utilizing the first security protocol in response to the movable barrier operator receiving the acknowledgment communication.

4. The system of claim 1 wherein the movable barrier operator is configured to eliminate the compatibility of the movable barrier operator with communications utilizing the first security protocol after a predetermined time period.

5. The system of claim 1 wherein the movable barrier operator includes a network interface configured to receive an acknowledgment communication from a remote resource via a network, the acknowledgment communication indicating that the remote control has updated to the second security protocol; and
the movable barrier operator configured to eliminate the compatibility of the movable barrier operator with communications from the remote control utilizing the first security protocol in response to receiving the acknowledgment communication.

6. The system of claim 1 wherein the movable barrier operator is configured to facilitate communicating second information representative of the second security protocol to a proxy device;
the remote control including a transceiver configured to receive the second information from the proxy device and transmit a first acknowledgment communication to the proxy device responsive to reception of the second information; and
the movable barrier operator further configured to receive a second acknowledgment communication from the proxy device indicating the remote control has updated to the second security protocol and, in response to receiving the second acknowledgment communication, eliminate the compatibility of the movable barrier operator with communications from the remote control utilizing the first security protocol.

7. The system of claim 1 wherein the movable barrier operator includes a memory configured to store information indicative of the remote control utilizing the second security protocol.

8. The system of claim 1 wherein the movable barrier operator includes communication circuitry configured to facilitate communicating, to a network entity, information indicative of at least one of the movable barrier operator and the network entity utilizing the second security protocol.

9. The system of claim 1 further comprising:
another remote control; and
the movable barrier operator is configured to eliminate compatibility of the movable barrier operator with communications from one of the remote controls utilizing the first security protocol in response to receiving information indicating the one remote control utilizes the second security protocol; and
the movable barrier operator is configured to maintain compatibility of the movable barrier operator with control signals from the other remote control utilizing the first security protocol until the movable barrier operator receives information indicating the other remote control utilizes the second security protocol.

10. The system of claim 1 wherein the movable barrier operator is configured to receive information representative of the second security protocol that includes information regarding at least one of:
modulation;
frequency;
encryption method;
cryptographic method;
unidirectional or bidirectional communication; and
multi-factor authentication.

11. The system of claim 1 wherein the communication includes a control signal configured to cause the movable barrier operator to move the movable barrier between the first position and the second position.

12. A method of updating security protocol for a movable barrier operator and a remote control, the remote control being configured to transmit communications utilizing a first security protocol to the movable barrier operator, the method comprising:
receiving, at the movable barrier operator, information representative of a second security protocol;

receiving, at the remote control, information representative of the second security protocol; and eliminating a compatibility of the movable barrier operator with communications utilizing the first security protocol from the remote control.

13. The method of claim 12 further comprising the remote control transmitting a communication utilizing the second security protocol; and wherein eliminating the compatibility of the movable barrier operator with communications utilizing the first security protocol from the remote control includes eliminating the compatibility of the movable barrier operator with communications utilizing the first security protocol from the remote control in response to the movable barrier operator receiving the communication utilizing the second security protocol.

14. The method of claim 12 further comprising the remote control transmitting an acknowledgment communication indicating the remote control utilizes the second security protocol; and wherein eliminating the compatibility of the movable barrier operator with communications utilizing the first security protocol from the remote control includes eliminating the compatibility of the movable barrier operator with communications utilizing the first security protocol from the remote control in response to the movable barrier operator receiving the acknowledgment communication.

15. The method of claim 12 wherein eliminating the compatibility of the movable barrier operator with communications utilizing the first security protocol from the remote control includes eliminating the compatibility of the movable barrier operator with communications from the remote control utilizing the first security protocol after a predetermined time period.

16. The method of claim 12 further comprising receiving, at the movable barrier operator, an acknowledgment communication from a remote resource indicating that the remote control has updated to the second security protocol; and wherein eliminating the compatibility of the movable barrier operator with communications utilizing the first security protocol from the remote control includes eliminating the compatibility of the movable barrier operator with communications utilizing the first security protocol from the remote control in response to the movable barrier operator receiving the acknowledgment communication from the remote resource.

17. The method of claim 12 further comprising the movable barrier operator transmitting information representative of the second security protocol to a proxy device;

wherein receiving, at the remote control, information representative of the second security protocol includes receiving the information representative of the second security protocol from the proxy device;

the remote control transmitting a first acknowledgment communication to the proxy device responsive to reception of the information representative of the second security protocol;

the movable barrier operator receiving a second acknowledgment communication from the proxy device indicating the remote control utilizes the second security protocol; and wherein eliminating the compatibility of the movable barrier operator with communications utilizing the first security protocol from the remote control includes eliminating the compatibility of the movable barrier operator with communications utilizing the first security protocol from the remote control in response to the movable barrier operator receiving the second acknowledgment communication from the proxy device.

18. The method of claim 12 further comprising storing, by a memory of the movable barrier operator, information indicative of the remote control utilizing the second security protocol.

19. The method of claim 12 further comprising transmitting to a remote resource information indicative of at least one of the movable barrier operator and the remote control utilizing the second security protocol.

20. The method of claim 12 further comprising maintaining the compatibility of the movable barrier operator with communications from a second remote control utilizing the first security protocol until the movable barrier operator receives information indicating the second remote control utilizes the second security protocol.

21. A non-transitory, computer-readable medium having instructions stored thereon, the instructions comprising:

instructions for receiving, at a movable barrier operator utilizing a first security protocol, information representative of a second security protocol;

instructions for receiving, at a remote control utilizing the first security protocol, information representative of the second security protocol; and instructions for eliminating a compatibility of the movable barrier operator with communications from the remote control utilizing the first security protocol.

* * * * *